United States Patent [19]

Hirano

[11] Patent Number: 4,473,126

[45] Date of Patent: Sep. 25, 1984

[54] COMBINATION WEIGHING SYSTEM

[75] Inventor: Takashi Hirano, Kobe, Japan

[73] Assignee: Yamato Scale Company, Limited, Akashi, Japan

[21] Appl. No.: 449,790

[22] Filed: Dec. 14, 1982

[30] Foreign Application Priority Data

Dec. 21, 1981 [JP] Japan ............................. 56-207779

[51] Int. Cl.³ ...................... G01G 9/00; G01G 19/22; G01G 19/32; G01G 19/413
[52] U.S. Cl. ..................................... 177/1; 177/25; 177/70
[58] Field of Search .......................... 177/25, 50, 70, 1

[56] References Cited

U.S. PATENT DOCUMENTS

| | | | |
|---|---|---|---|
| 3,939,928 | 2/1976 | Murakami et al. | 177/25 |
| 3,959,636 | 5/1976 | Johnson et al. | 177/70 X |
| 4,267,894 | 5/1981 | Hirano et al. | 177/25 |
| 4,308,928 | 1/1982 | Oshima | 177/25 |
| 4,313,507 | 2/1982 | Hays | 177/1 |
| 4,336,852 | 6/1982 | Hirano | 177/25 |
| 4,336,853 | 6/1982 | Hirano | 177/25 |
| 4,341,274 | 7/1982 | Hirano et al. | 177/25 |
| 4,344,492 | 8/1982 | Hirano | 177/25 |

FOREIGN PATENT DOCUMENTS

2075779A 5/1981 United Kingdom .

Primary Examiner—George H. Miller, Jr.
Assistant Examiner—Patrick W. Foster
Attorney, Agent, or Firm—Senniger, Powers, Leavitt and Roedel

[57] ABSTRACT

A novel type of combination weighing system is provided; wherein two combination weighing devices are provided for weighing two kinds of articles, respectively, the first device and its associated combination selecting circuits are used for obtaining some combinations of the weighing units of the first device which provide total weights of the articles thereon falling within a predetermined range of weight, and the second device and its associated combination selecting circuits are used for obtaining a combination of the weighing units of the second device which provide a total weight of the articles thereon inclusive of the total weight obtained above by the first device, which is nearest to a predetermined target weight; for finally obtaining a combined group of first and second articles wherein the total weight of the first articles falls within the predetermined range of weight and the total weight of the first and second articles is nearest of all to the predetermined target weight.

4 Claims, 4 Drawing Figures

COMBINATION WEIGHING SYSTEM

This invention relates to a novel combination weighing system, especially to that used for grouping two kinds of articles in mixed fashion under a predetermined weight requirement.

A combination weighing machine, which is also referred to as a "combination balance" or "combination weighing device", is generally used for packing a plurality of articles, such as cakes, fishes and vegetables, especially those having substantial variance in their unit weights, in each bag or the like in such a manner that the each pack contains the articles of substantially fixed total weight. A typical example of combination weighing machine is disclosed in U.S. Pat. No. 4,267,894 granted to Hirano et al, wherein a plurality of articles are weighed individually by a plurality of weighing units at the same time, one to all of the weighing units are extracted sequentially in accordance with mathematical combinations to obtain corresponding total weights of articles on the respective combinations, and these total weights are sequentially compared with a predetermined target weight to obtain finally one of the total weights, which is nearest of all to the target weight, and the corresponding weighing units. This type of combination weighing machine is used generally for grouping a single kind of articles, since all the weighing units are equivalent in combination selection.

It is sometimes desired to add a second kind of articles to each pack, maintaining the total weight as it is. A modified combination weighing machine has been proposed for this purpose, as disclosed in the opened U.K. patent specification No. GB 2075779A. In this machine, some of the weighing units are specified for use for different kinds of articles. However, the weight of the second kind of articles could not be specified for guarantee, though the whole weight of the each pack was guaranteed.

An object of this invention is to provide a novel combination weighing machine and method which can group two kinds of articles in such manner that the each group has a total weight which is equal or nearest to a predetermined target weight, while the weight of one kind of articles is within a predetermined range.

In accordance with this invention, provided is a combination weighing machine including first and second combination weighing devices which are basically similar to the prior art combination weighing devices. The first device is arranged to select combinations of its discrete weighing units which provide respectively total weights falling within a predetermined range, and the second device is arranged to receive the selected total weights from the first device to cause them to participate in the combination and to select a combination of its discrete weighing units which provides a total weight equal or nearest to a predetermined target weight. Then, the combinations selected by the first and second devices to provide the total weight which is finally optimum are sensed and provided for use in utilization means such as loading and unloading means of the weighing units.

Other features and operation of the machine and method of this invention will be described in more detail hereinunder with reference to the accompanying drawings.

In the drawings.

Throughout the drawings, the same reference numerals are given to corresponding structural components.

As described, for example, in the opened U.K. patent specification No. GB 2077067A, the combination weighing machine comprises a plurality of discrete weighing units, each including a weighing cradle for carrying articles to be weighed, automatic loading and unloading mechanisms for loading and unloading the cradle with the articles, and a weight sensor for producing an electric signal indicative of the weight of articles on the cradle. However, these components will not be described further, since they are well known in the art and constitute no subject of this invention.

Figure 1:
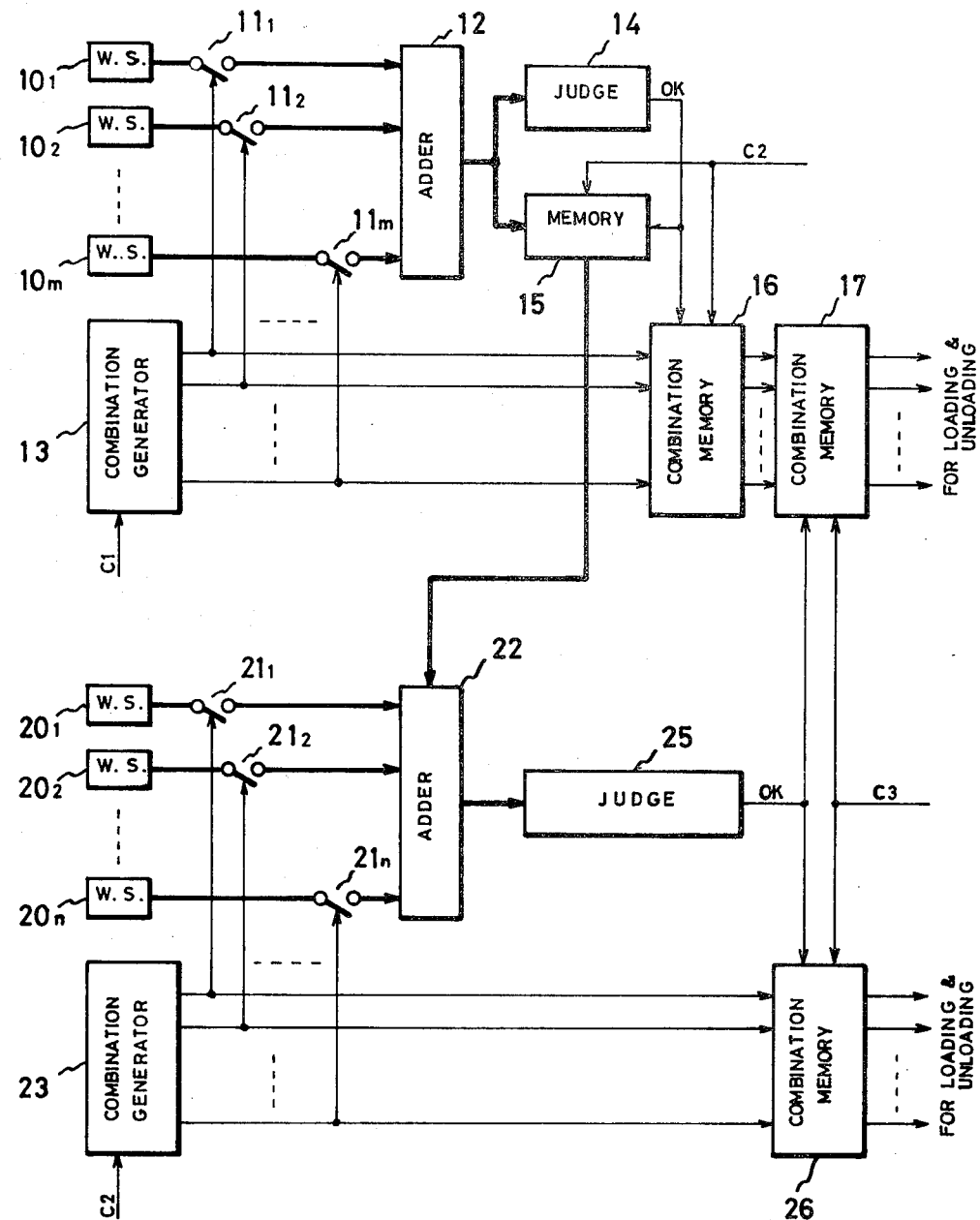
FIG. 1 is a block diagram representing an embodiment of the combination weighing machine according to this invention.

Referring to FIG. 1, weight sensors $10_1, 10_2, \ldots 10_m$ (m is an integer) of the corresponding weighing units (not shown) are coupled through normally-open switches $11_1, 11_2, \ldots 11_m$ to an adder circuit 12. The switches 11 have control terminals, respectively, coupled to outputs of a combination generator 13. As described in the above-cited patent specifications, the combination generator 13 may be an m-bit binary counter driven by a suitable clock generator (not shown), which produces logic "1" level output signals from its outputs selected sequentially in accordance with mathematical combinations $_mC_r$, where $r=1$ to m, the total number of which should be $2^m - 1$. Thus, the weight indicating signals from the respective weight sensors 10 are sequentially supplied in selected combinations through the switches 11 to the adder 12 and summed therein.

Figure 2:
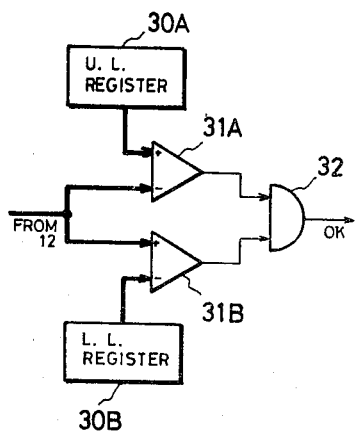
FIGS. 2 and 3 are block diagrams representing preferred embodiments of judging circuits in FIG. 1.

The output signals of the adder 12, which are indicative of the combined weights of articles on the sequentially selected weighing units, are applied successively to a judging circuit 14, an example of which is shown in FIG. 2. In FIG. 2, the output signals from the adder 12 are coupled to a pair of comparators 31A and 31B whose second inputs are supplied respectively from an upper limit register 30A and a lower limit register 30B. The upper and lower limits of a predetermined allowable range of weight are registered previously and supplied to the comparators 31A and 31B, respectively. The outputs of the comparators 31A and 31B are coupled to the both inputs of an AND gate 32. The comparator 31A is arranged to provide an output signal when the input from the adder 12 is less than the content of the register 30A and the comparator 31B is arranged to provide an output signal when the input from the adder 12 is greater than the content of the register 30B, thereby the AND gate 32 produces an output signal OK when the weight indicated by the output signal of the adder 12 is within the predetermined range.

The output signals of the adder 12 are also applied to a memory 15 and stored therein in response to the OK signal from the AND gate 32 in the judging circuit 14. The combined output signals of the combination generator 13 are also applied to a combination memory 16 and stored therein in response to the OK signal from the judging circuit 14. Thus, when a cycle of combination operation controlled by the combination generator 13 finishes, all combined weights falling within the predetermined range are stored in the memory 15 and corresponding combinations of the weighing units are stored in the combination memory 16. The memories 15 and 16 have their outputs coupled respectively to an additional input of a second adder circuit 22 and corresponding inputs of an auxiliary combination memory 17 and are arranged to sequentially apply their contents thereto in response to second control pulse C2 provided from a control circuit (not shown), as described in detail later. The auxiliary memory 17 is arranged to update its content with the current input signals in response to an output signal OK provided from a judging circuit 25, as described later, and to discharge its content to utilization means (not shown) in response to third control signal C3 applied from the control circuit (not shown), as also described later.

As a feature of this invention, the combination weighing machine comprises another group of discrete weighing units (not shown) including weight sensors $20_1$, $20_2$, ... $20_n$ (n is another integer), respectively. Weight indicating signals from the weight sensors 20 are coupled through normally open switches $21_1$, $21_2$, ... $21_n$ to the adder circuit 22. The switches 21 have control terminals coupled respectively to outputs of another combination generator 23 and are controlled the same as the switches 11 are controlled by the combination generator 13. Operation of the adder 22 is also similar to that of the adder 12, except that the current output signal from the memory 15 is always added to the selected output signals of the weight sensors 20, so that the output signal of the adder 22 is indicative of a combined total weight of articles from selected ones of the weight sensors 10 and 20.

Figure 3:
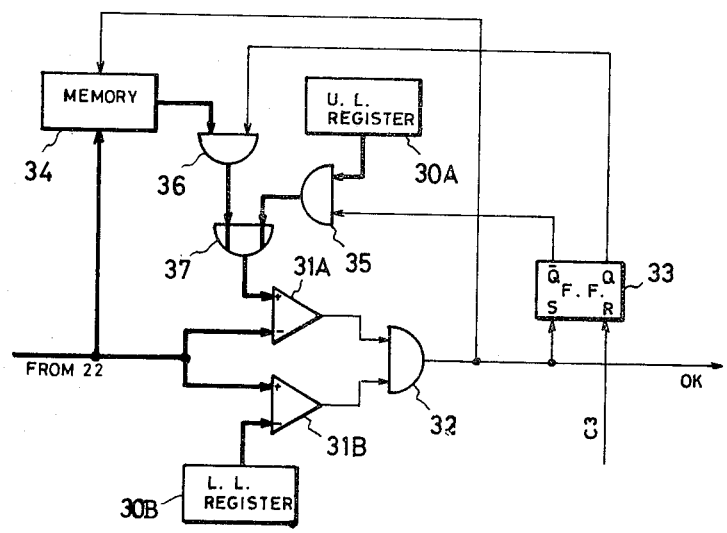

The output signals of the adder 22 are sequentially applied to a judging circuit 25, an example of which is shown in FIG. 3. The circuit of FIG. 3 is on the same basis as the circuit of FIG. 2 except that the output of the upper limit register 30A is applied to the comparator 31A through AND gate 35 and OR gate 37. The output of the adder 22 is also coupled to a memory 34 whose output is coupled through AND gate 36 to the second input of the OR gate 37. The output of the AND gate 32 is also coupled to set input of a flip-flop circuit 33 whose reset terminal is coupled to receive the third control signal C3. Q and $\overline{Q}$ outputs of the flip-flop 33 are coupled respectively to the second inputs of the AND gates 36 and 35. The memory 34 is arranged to update its content with the current input signal in response to the output signal OK of the AND gate 32. The outputs of the combination generator 23 are also coupled to a combination memory 26 which is arranged as same as the auxiliary memory 17 to update its content with the current input combination in response to the OK signal from the judging circuit 25, and to apply the content to the utilization means in response to the third control signal C3.

Figure 4:
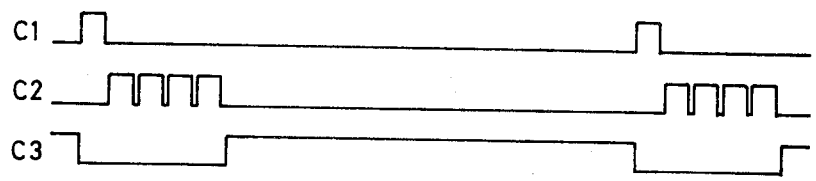
FIG. 4 is a timing diagram presented for aiding explanation of operation of the circuit of FIG. 1.

In operation, the associated control circuit (not shown) provides three timing control signals C1, C2 and C3, as shown in FIG. 4. The signal C1 occurs at the beginning of the each cycle of operation, that is, just after the selected weighing units have been unloaded and then loaded again, and is applied to the first combination generator 13 to start its operation. As described above, some total weights falling within the predetermined range of weight and corresponding combinations should be stored, respectively, in the memories 15 and 16, when the cycle of operation of the combination generator 13 has been finished. Then, the second control pulses C2 are provided at a period corresponding to one cycle time of operation of the second combination generator 23. Though four pulses C2 appear in each cycle in FIG. 4, this number of pulses was selected experimentally so that the number of total weights stored in the memory 15 (i.e. the number of combinations stored in the memory 16) does not exceed this number of pulses C2. In response to each second control pulse C2, the contents of the memories 15 and 16 are applied sequentially to the adder 22 and the memory 17 respectively and, at the same time, the second combination generator 23 is actuated to start its operation. Then, the combination selecting operation for the second group of weighing units $20_1$, $20_2$, ... $20_n$ is executed under control of the combination generator 23 the same as in the case of combination generator 13, except that the content of the memory 15 participates always in the each combination, that is, the output sum of the adder 22 includes always the output sum of the memory 15. The sum output signal of the adder 22 is coupled to the judging circuit 25.

In the judging circuit 25, as shown in FIG. 3, the sum signal from the adder 22 is applied to the pair of comparators 31A and 31B and the memory 34. At first, the flip-flop 33 is in reset condition and the AND gate 35 is opened by its $\overline{Q}$ output signal, thereby coupling the upper limit register 30A to the comparator 31A. Accordingly, the judging circuit 25 acts the same as the judging circuit 14 of FIG. 2 and produces an OK signal from the AND gate 32 when the input sum falls within the predetermined range of weight. The OK signal from the AND gate 32 drives the flip-flop 33 into set condition, thereby closing the AND gate 35 and opening the AND gate 36. The OK signal is also applied to the memory 34 as an update signal to write the current input sum weight therein. Thus, the written sum in the memory 34 is applied through the gates 36 and 37 to the comparator 31A as a new upper limit of the range of weight. The OK signal is further applied to both combination memories 17 and 26 as an update signal to update their contents with the current input combinations corresponding to the content of the memory 34. It should be understood that the content of the memory 34 is successively substituted with the subsequent input which is less than itself and gradually approaches the lower limit in the register 30B. When the operation for all the total weights stored in the memory 15 are completed, the most preferable total weight is stored in the memory 34 and the combination of the weighing units providing this result is stored in the both combination memories 17 and 26. At this time, the third control signal C3 is applied to the both memories 17 and 26 to discharge their contents to the corresponding weighing units for unloading and then loading them. When the unloading and loading operations are completed, the next first control signal C1 occurs to start the next cycle of operation.

In the above-described embodiment, the resultant total weight of the both kinds of articles is least or nearest to the lower limit of the range of weight of all that are obtainable with all the allowable combinations for the first kind of articles. As readily understood, this condition may be advantageous for the vendor's economy. However, this invention is not limited to the such arrangement. For example, the arrangement can be modified to cause the total weight to approach the upper limit or an arbitrary target weight. Some examples of the judging circuit 25 which can be used for this modification are shown in the opened U. K. patent specification No. GB 2089153A, filed on the same name of inventor.

While it is considered to use the arrangement of FIG. 3 in the judging circuit 14, it is to be noted that this arrangement does not always provide the most preferable result due to variance of weights of the respective weighing units.

I claim:

1. A combination weighing machine, comprising a first combination weighing device having a plurality of weighing units for selecting combinations which provide total weights falling within a predetermined range of weight from a predetermined set of combinations of said weighing units, and a second combination weighing device having a plurality of weighing units for selecting a combination which provides a total weight nearest of all to a predetermined target weight from a predetermined set of combinations of said weighing units; characterized by means for supplying in order said total weights corresponding to said combinations selected by said first combination weighing device to said second combination weighing device to cause them one by one to participate in said combinations of said second combination weighing device, and means for supplying the combination finally selected by said second combination weighing device together with the corresponding combination selected by said first combination weighing device to utilization means.

2. A combination weighing machine, according to claim 1, characterized in that said first combination weighing device comprises a first combination memory for storing in order said selected combinations, a total weight memory for storing in order said total weights corresponding to said selected combinations, and a second combination memory coupled to the output of said first combination memory and arranged to update its content with the current input signals from said first combination memory in response to an update command signal; said second combination weighing device comprises means for receiving the output signal from said total weight memory to cause it to participate in the combinations of said second combination weighing device, comparator means for generating said update command signal when the total weight corresponding to the each combination is nearer said predetermined target weight than the total weight corresponding to any combination occuring previously, and a third combination memory for storing said combination selected by said second combination weighing device; and said machine further comprises means for sequentially applying the content of said first combination memory to said second combination memory and, at the same time, the content of said total weight memory to said second combination weighing device in accordance with a predetermined timing schedule, and means for supplying the contents of said second and third combination memories at the same time to utilization means in accordance with a predetermined timing schedule.

3. Combination weighing apparatus comprising first and second combination weighing devices each having a set of balances, the first having means for determining the values of combinations of weights on its balances and selecting those combinations which total an amount within a predetermined range, the second having means for determining the values of combinations of weights comprising values selected by the first of said devices and values of combinations of weights on the balances of the second and selecting a combination which totals an amount closest to a predetermined reference weight, said apparatus having means for supplying the combinations selected by the first combination weighing device to the second combination device for participation in the combinations of the latter, and means for supplying the combination finally selected by the second combination weighing device to a utilization device.

4. The method of delivering a first quantity of a first product and a second quantity of a second product measured by weight with the first quantity being of an acceptable weight relative to a first standard for the first quantity and the total of said quantities being of an acceptable weight relative to a second standard for the total, utilizing a first set of weighing units each adapted to weigh a fraction of the first quantity and adapted for unloading of product therefrom to contribute to a delivery and a second set of weighing units each adapted to weigh a fraction of the second quantity and adapted for unloading of product therefrom to contribute to a delivery and a second set of weighing units each adapted to weigh a fraction of the second quantity and adapted for unloading of product therefrom to contribute to a delivery, said method comprising for each delivery the steps of:

generating the values of combinations of weights measured by the weighing units of the first set, comparing said values with said first standard to select a combination of said values of weights on the weighing units of the first set providing an acceptable weight quantity, thereby to select a combination of the weighing units of the first set to be unloaded to deliver said acceptable weight quantity, generating in a second generating step the values of combinations of weights measured by the weighing units of the second set and also the selected combination of the values of weights measured by the weighing units of the first set, comparing the values generated in said second generating step with said second standard to select a total combination of weight values providing a total acceptable weight quantity, thereby to select a total combination of the weighing units to be unloaded to deliver said total of said quantities, and delivering said total combination finally selected as a result of the second generating step to utilization means.

* * * * *